Sept. 29, 1959     R. W. JENSEN ET AL     2,906,849
TEMPERATURE RESPONSIVE PNEUMATIC CONTROL ORIFICE MEANS
Filed Sept. 30, 1957
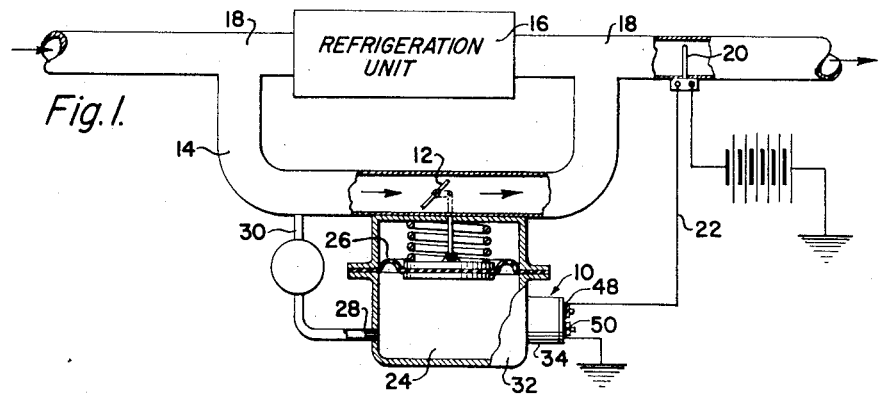
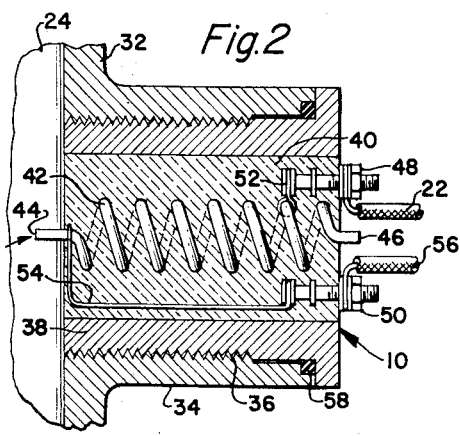
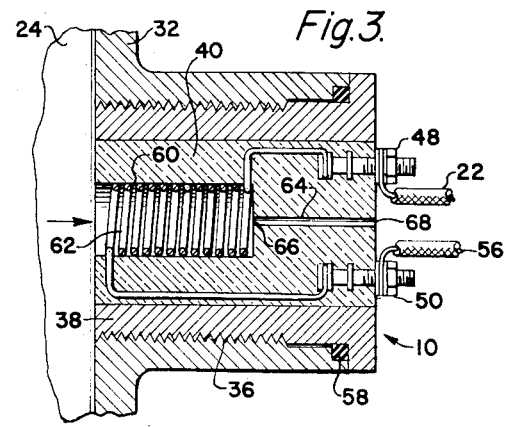
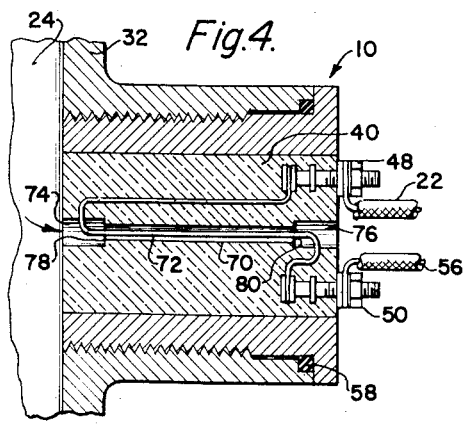
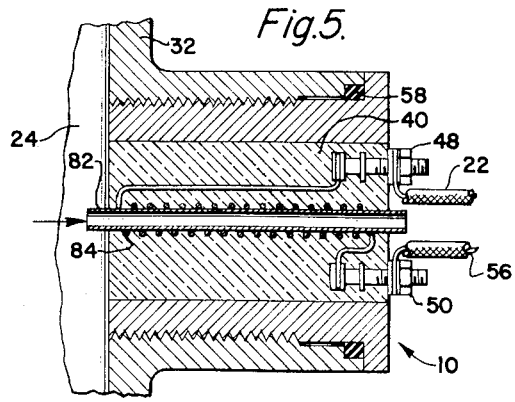
HARRY E. ETCHES,
RAYMOND W. JENSEN,
INVENTORS.
BY
Herschel C. Omohundro
attorney

United States Patent Office 2,906,849
Patented Sept. 29, 1959

2,906,849

TEMPERATURE RESPONSIVE PNEUMATIC CONTROL ORIFICE MEANS

Raymond W. Jensen, Phoenix, and Harry E. Etches, Mesa, Ariz., assignors to The Garrett Corporation, Los Angeles, Calif., a corporation of California Application September 30, 1957, Serial No. 686,952

4 Claims. (Cl. 219—39)

This invention relates generally to temperature responsive control apparatus, and is more particularly directed to an orifice means, in the proximity of which air is heated by electrical energy whereby a simple arrangement is established to provide cooperation between electrical and pneumatic control elements.

Air conditioning systems particularly for aircraft require compact controls, some of which utilize electrical elements for sensing temperature and pneumatic valves for controlling flow of air through such air conditioning systems. There has been a need for a device which will translate an electrical signal into a pneumatic signal capable of actuating the controls in aircraft air conditioning systems or any equipment wherein electrical signals are relied upon to effect the operation of pneumatic control elements.

According to the present invention, a temperature responsive pneumatic control means is adapted to receive electrical energy which may be varied by a thermostatic or other comparable device to change the pneumatic pressure which actuates a valve for controlling the flow of air through a conduit such as a bypass extending around a refrigeration unit.

It is an object of the present invention to provide a very simple, temperature responsive control means in which an electrical signal is utilized to create a corresponding pneumatic response, which in turn governs the operation of a pneumatic actuator.

Another object of the invention is to provide a temperature responsive pneumatic control means having a variable orifice effect, which control means is structurally simple and compact, thus increasing its usefulness in aircraft air conditioning control systems.

Another object of the invention is to provide a temperature responsive pneumatic control orifice means wherein an electrical heating element modulates the temperature of air passing through a restricted orifice, thereby changing the density of the air, and consequently varying the amount of air which may flow through the orifice whereby modulation of pneumatic pressure may be effected by an electrical signal.

Another object of the invention is to provide a temperature responsive pneumatic control orifice means which may readily be installed in connection with various pneumatic valves and control devices.

A further object of the invention is to provide a temperature responsive pneumatic control orifice means which is very simple and economical in construction, efficient and durable.

Other objects and advantages of the invention may be apparent from the following specification, appended claims and accompanying drawings, in which:

Figure 1 is a diagrammatic view of an air conditioning system in which a temperature responsive pneumatic control orifice means, constructed according to the present invention, is embodied;

Fig. 2 is an enlarged sectional view showing details of the temperature responsive pneumatic control orifice employed in the air conditioning system shown in Fig. 1;

Figs. 3, 4 and 5 are similar sectional views showing modified forms of the invention.

As shown in Fig. 1, the temperature responsive pneumatic control orifice means 10 of the present invention may be used in connection with an air conditioning system which employs a flow controlling valve 12 located in a bypass conduit 14 extending around a refrigeration unit 16 communicating with a conduit 18. The system also includes a thermostat 20 disposed in the conduit 18 downstream from the refrigeration unit and beyond the point of return of the bypass connection to the conduit. This thermostat 20 governs the flow of electrical current to the temperature responsive pneumatic control orifice means 10 through a conductor 22. The orifice means 10 communicates with a pneumatic pressure control chamber 24 arranged at one side of a diaphragm 26 disposed to actuate the valve 12 for modulating flow through the conduit 14, in accordance with the electrical signal transmitted by the thermostat 20, which is responsive to temperature in the conduit 18 downstream of the refrigeration unit 16. The pressure chamber 24 receives compressed air from the conduit 14 upstream of the valve 12 through a tube 30 having a restricted orifice 28 mounted therein.

In operation, air flows through the refrigeration system as indicated by arrows in Fig. 1 of the drawings. When the thermostat 20 senses an air temperature which exceeds a predetermined value, an electrical signal of increased intensity is conducted via the conductor 22 to the orifice means 10, which causes an increase of pressure in the chamber 24, as will be hereinafter described in detail. As pressure in the chamber 24 increases, the diaphragm 26 forces the valve 12 toward a closed position, causing more air to pass through the refrigeration unit 16 to lower the air temperature in the conduit 18 downstream thereof. When the thermostat 20 senses an air temperature below a predetermined desired value, the intensity of the electrical signal passing through the conductor 22 is decreased, causing the orifice means 10 to reduce pressure in the chamber 24, permitting the valve 12 to move toward an open position and thereby bypassing an increased amount of air through the conduit 14, thus increasing the air temperature in the conduit 18 downstream of the refrigeration unit 16.

Referring to Fig. 2 of the drawings, it will be seen that a housing 32, having the chamber 24 formed therein, is provided with a cylindrical portion 34, which extends outwardly from the chamber 24 and contains the control orifice means of the present invention. The cylindrical portion 34 is provided with internal screw threads 36, into which a sleeve 38 having external screw threads is inserted. Positioned in the sleeve 38 is a ceramic casting 40, having a helically-shaped, tubular orifice means 42 embedded therein. This tubular orifice means 42 is provided with an open end 44, which communicates with the chamber 24 and an open end 46, which communicates with atmosphere or a region of pressure lower than that in the chamber 24. The tubular orifice means 42 is constructed of a suitable material which permits it to function as an electrically operated resistance type heating element, so that air passing through this tubular orifice means may be heated and expanded to limit the amount of air which may pass through the tube 42 in accordance with the temperature thereof.

Terminals 48 and 50 are embedded in the ceramic casting 40, and are electrically connected to the tubular orifice means 42 near its opposite ends by means of conductors 52 and 54. The terminal 50 is electrically connected by means of a conductor 56 to a suitable ground, while the terminal 48 is connected to the conductor 22.

A sealing ring 58 is disposed between the sleeve 38 and the cylindrical portion 34 of the housing 32 to prevent undesired leakage of pneumatic fluid from the chamber 24.

Operation of the temperature responsive pneumatic control orifice means, in accordance with the present invention, is substantially as follows:

When the electrical signal carried by the conductor 22 varies, the temperature of the tubular orifice 42 varies correspondingly, since it acts as a resistance type heating element. As the temperature of the tubular orifice 42 varies, it varies the density of air passing through the orifice means, thereby affecting the amount, or weight flow, of air which may pass from the inlet 44 to the outlet 46 of the tubular orifice means 42. It will be understood that an increase of flow through the tubular orifice 42, occasioned by a reduction of temperature thereof, will reduce pressure in the chamber 24 downstream of the orifice 28, while an increase in temperature of the tubular orifice 42 will cause an increase of pressure in the chamber 24 downstream of the orifice 28.

In the modification shown in Fig. 3 of the drawings, the ceramic casting 40 is provided with a bore portion 60 containing a heating element 62, which is disposed in the form of a coil and has its opposite ends connected to the terminals 48 and 50. Concentric with the bore 60 is a reduced bore 64, forming a restricted bleed orifice having an inlet 66 adjacent the coil 60 and an outlet 68 which communicates with atmosphere or pressure lower than that in the chamber 24.

The operation of the control orifice shown in Fig. 3 of the drawings is similar to that of the form shown in Fig. 2 of the drawings, but differs with respect to the manner in which the air is heated to restrict flow through the reduced bore or orifice 64. As shown by arrows in Fig. 3, air first passes into the bore 60 and around the coils of the heating element 62 disposed therein. Thus, air is first heated before it passes through the restricted orifice 64 from the inlet end 66 to the outlet end 68 thereof.

In the modification shown in Fig. 4 of the drawings, the ceramic casting 40 is provided with a restricted orifice 70 and a heating element 72 extends longitudinally through the orifice 70. Enlarged bore portions 74 and 76 communicate with an inlet 78 and outlet 80, respectively, of the restricted orifice 70. Opposite ends of the heating element 72 are connected with the terminals 48 and 50, which are embedded in the ceramic casting 40. Likewise, portions of the heating element 72 near their opposite ends are also embedded in the ceramic casting 40.

In the operation of the form of the invention shown in Fig. 4, air passing through the restricted orifice 70 flows along the heating element 72, whereby the air is heated to cause a restriction of flow through the orifice 70.

In the modification shown in Fig. 5, the ceramic casting 40 supports an orifice tube 82 therein. Surrounding the orifice tube 82 is a coiled heating element 84, the opposite ends of which are connected to the terminals 48 and 50. It will be noted that the coiled heating element 84 and the tube 82 are embedded in the casting 40 together with the terminals 48 and 50.

In the operation of the structure shown in Fig. 5, the convolutions of the heating element 84 being contiguous to the periphery of the tube 82, heat the same, whereby air passing therethrough in the direction indicated by arrows is heated, causing a restriction of the flow of air through the tube.

In all forms of the invention shown, heat is applied in varying amounts to air flowing through an elongated restricted passage or orifice to decrease or increase the weight flow of air through the passage and thus change the pressure in the actuating pressure chamber, such as 24 of an actuator for a flow controlling valve of the type shown at 12. As previously pointed out, such variations in chamber pressure effect the movement of the valve 12 to regulate air flow through bypass 14.

Various modifications of the present invention may be resorted to in a manner limited only by a just interpretation of the following claims.

We claim:

1. In a temperature responsive control orifice the combination of: means forming a restricted tubular passage having inlet and outlet ends; and an electrical heating element disposed to heat fluid in the proximity of said restricted passage means, the thermal expansion of the fluid serving to increase the volume and reduce the density and weight flow of the fluid passing through said restricted passage, said heating element being a coil disposed adjacent the inlet end of said restricted passage means.

2. A temperature responsive control orifice means comprising: a dielectric body having a passage extending therethrough, a portion of said passage being of restricted cross section and the balance being of relatively larger cross section; and an electrical heating element disposed in the part of the passage having the enlarged cross section, said heating element causing the thermal expansion of fluid approaching the portion of said passage having the restricted cross section.

3. A temperature responsive control orifice means comprising: a dielectric body having a passage extending therethrough, a portion of said passage being of restricted cross section and the balance being of relatively larger cross section; and an electrical resistance type heating element coiled in the part of the passage having the larger cross section, said heating element causing the thermal expansion of fluid flowing toward the other part of said passage.

4. A temperature responsive control orifice means comprising: a dielectric body having a passage extending therethrough, substantially half of the length of said passage being of restricted cross section and the rest of the length being of larger cross section; and a resistance element coiled along the wall of the passage portion of larger cross section, said resistance element serving to heat and cause thermal expansion of fluid flowing toward the restricted portion of said passage.

References Cited in the file of this patent

UNITED STATES PATENTS

| | | |
|---|---|---|
| 1,119,840 | Kuhn | Dec. 8, 1914 |
| 1,187,924 | Pearson | June 20, 1916 |
| 1,378,927 | Witham | May 24, 1921 |
| 1,403,594 | Duo | Jan. 17, 1922 |
| 1,455,633 | Lundgaard | May 15, 1923 |
| 1,756,688 | Hutchinson | Apr. 29, 1930 |
| 2,241,086 | Gould | May 6, 1941 |
| 2,433,493 | Turner | Dec. 30, 1947 |

FOREIGN PATENTS

| | | |
|---|---|---|
| 90,639 | Sweden | Oct. 26, 1937 |